Sept. 29, 1970　　　　G. G. SCARROTT　　　　3,531,181
LIGHT GUIDE ELECTRO-OPTICAL DEVICES
Filed Feb. 7, 1968
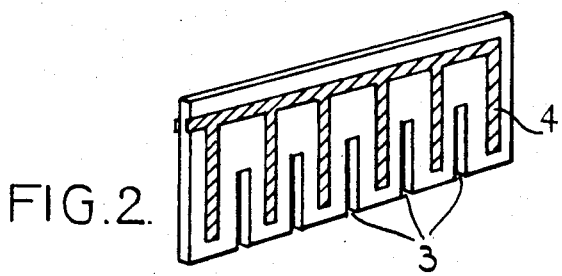
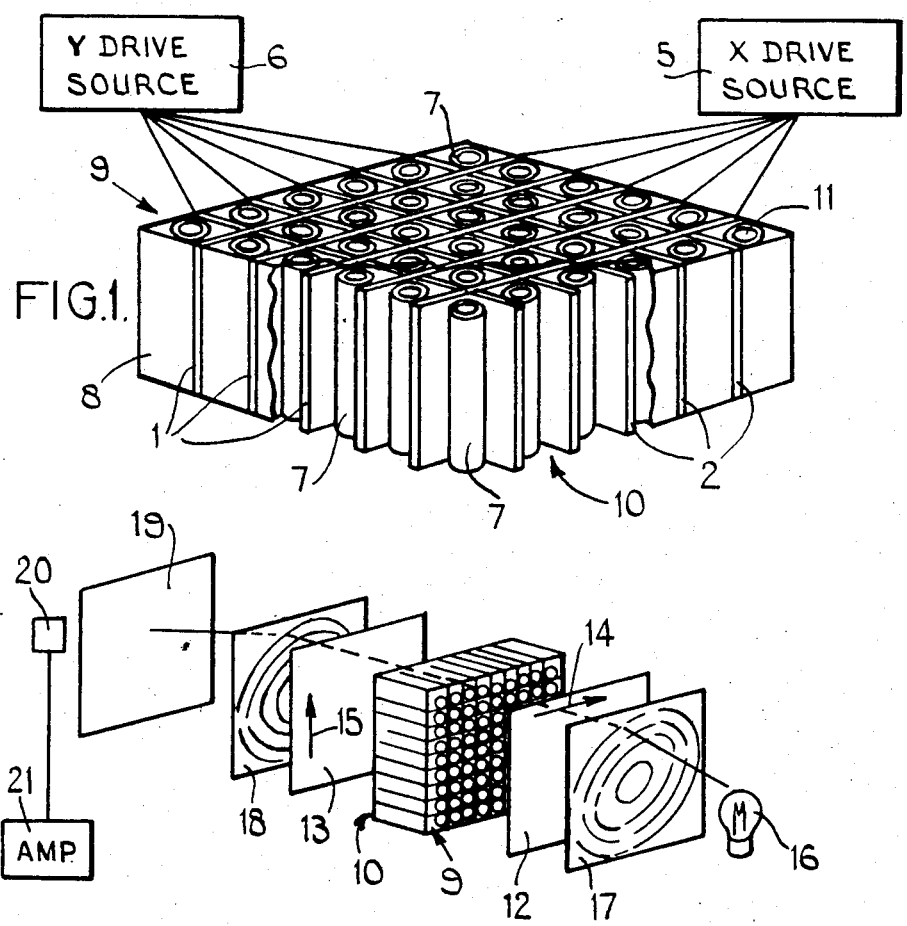
INVENTOR
GORDON GEORGE SCARROTT
BY Hone and Baxley
ATTORNEYS

United States Patent Office 3,531,181
Patented Sept. 29, 1970

3,531,181
LIGHT GUIDE ELECTRO-OPTICAL DEVICES
Gordon George Scarrott, Welwyn Garden City, England, assignor to International Computers and Tabulators Limited
Filed Feb. 7, 1968, Ser. No. 703,626
Claims priority, application Great Britain, Feb. 18, 1967, 7,841/67
Int. Cl. G02f 1/26; G02b 5/14
U.S. Cl. 350—150                                    9 Claims

ABSTRACT OF THE DISCLOSURE

An electro-optical switching device consists of two groups of mutually perpendicular printed circuit boards which are interlocked with one another to form a matrix of cells. Each cell contains a glass tube approximately 1 mm. in diameter and 2 cm. long which is filled with a liquid electro-optic material, such as nitrobenzene. A parallel beam of plane polarised light is directed through the nitrobenzene in each tube and due to the different refractive indices of the glass tube and the nitrobenzene total internal reflection of the light beam occurs in the tubes. By applying an electrical potential between pairs of printed circuit boards on opposite side of a selected cell, the polarisation of transmitted light is modified.

BACKGROUND OF THE INVENTION

This invention relates to electro-optical devices and to apparatus utilising such devices.

An electro-optical switch, and an optical information storage device which utilises the switch, are described in British patent specification Ser. No. 1,098,183. Briefly, the switch comprises an element of an electro-optic material, such as nitrobenzene, positioned between crossed polarizers, and provided with electrodes for applying electric fields to the element in directions parallel to the planes of polarization of the polarizers. Light is not transmitted by the switch if no voltage is applied to the electrodes, or if a voltage is applied to one electrode only. The application of appropriate voltages to both electrodes produces an electric field in the element in a direction at 45° to the planes of polarization. The element produces a phase difference between light components parallel and perpendicular, respectively, to the electric field. Consequently, plane polarized light incident on the element emerges with elliptical polarization. Thus, a substantial fraction of the light incident on the switch may be transmitted through the switch.

The phase difference between the light components produced by such an element is dependent upon the optical path length in the element, the material of which the element is made, and the strength of the electric field. In a typical case, a path length of about 2 cms. would be necessary when nitrobenzene is used as the electro-optic material. The aperture of such an element might be several square centimetres so that the volume of material in the element might be 5 to 10 cc. The electrostatic energy stored in such a volume of the material is substantial and a high power driving signal is required to operate the switch in a short time.

SUMMARY OF THE INVENTION

According to one aspect of the invention an electro-optical device includes a straight elongate element of electro-optic material having two end faces and a side surface bounding the element between said end faces; means operative to direct a substantially parallel beam (as hereinafter defined) of plane polarised light onto one of said end faces in a direction aligned with the length of said element; a material surrounding at least the side surface of the element, to produce an interface extending round the element and along the length of the element, said interface being effective to cause total internal reflection of light from the beam passing along the element; and means operable to apply an electric field across the element.

According to another aspect of the invention electro-optical apparatus includes a plurality of straight elongate elements of electro-optic material extending parallel to one another, each element having first and second end faces and a side surface bounding the element between the end faces; means operative to direct a substantially parallel beam (as hereinafter defined) of plane polarised light onto the first end face of each element in a direction aligned with the length of the elements; a material surrounding each element to produce an interface extending round each element and along the length of each element, each said interface being effective to cause total internal reflection of light from the beam passing along the corresponding element; a polariser positioned to receive light transmitted by each of the elements; and means for applying an electric field across any selected one of said elements to modify the polarization of the light transmitted by that element.

The term "a substantially parallel beam" is used herein to mean a beam in which the rays of light diverge by appproximately 2°, or less, from the main axis of the beam.

BRIEF DESCRIPTION OF THE DRAWING

FIG. 1 is a view partly in section of a matrix of electro-optical devices,

FIG. 2 shows the construction of an electrode for the matrix of FIG. 1,

FIG. 3 shows the matrix utilised in an information storage device.

DESCRIPTION OF THE PREFERRED EMBODIMENT

A matrix of square cells is formed by two groups of thin rectangular printed circuit boards 1, 2 extending at right angles to one another. Each board 1, 2 has a set of spaced parallel slots 3 extending from one edge of the board to the middle of the board. The group of boards 1 are arranged with their slotted edges lowermost and the group of boards 2 are arranged with their slotted edges uppermost so that the two groups of boards interlock one in the other. The square cells formed by the boards 1, 2 are approximately 1 mm. across and 20 mm. long. Each board 1, 2 carries a comb-like electrode array 4 on each side (see FIG. 2). For clarity the electrodes 4 are not shown in FIG. 1. The electrode arrays 4 on the boards 1 are connected to an X drive source 5 and the electrode arrays 4 on the boards 2 are connected to a Y drive source 6.

A tube of borosilicate glass 7, approximately 1 mm. in diameter and a little more than 2 cm. in length, is inserted in each cell of the matrix. Preferably before insertion of the tubes 7, the ends of the tubes 7 are sealed, so that the whole matrix assembly may be immersed in a potting compound 8 to bond the boards and the tubes together in a solid mass. The surfaces 9 and 10 containing the ends of the tubes 7 are ground flat to an extent sufficient to open the ends of the tubes 7. These surfaces 9 and 10 are then painted with an opaque paint (not shown), so that light can be transmitted from one surface to the other only through the spaces inside the glass tubes 7.

The space inside each of the glass tubes 7 is completely filled with nitrobenzene by placing the matrix assembly in a tank of nitrobenzenen (not shown). The refractive index of the glass forming the tubes 7 relative to that of the nitrobenzene is such that the light rays, of a substantially parallel light beam which is directed along the axis of a tube, will be totally internally reflected at the boundary between the glass and the introbenzene. Hence, the thin columnar elements 11 of nitrobenzene within the tubes behave as light guides and light incident on one surface 9 of the matrix is transmitted along the elements and emerges from the opposite surface 10 of the matrix.

Referring to FIG. 3, the matrix of FIG. 1 is shown in an information storage device where it is utilised for illuminatign selected areas of a photographic film which stores data. A polarising sheet 12 is positioned adjacent the surface 9 of the matrix and a similar polarising sheet 13 is positioned adjacent the surface 10 of the matrix. The planes of polarisation indicated by arrows 14, 15 of the matrix. The planes of polarisation indicated by arrows 14, 15 of the polarising sheets 12, 13 are mutually perpendicular and are aligned parallel with the boards 1 and 2 respectively. Light from a lamp 16, or other light source, is focussed by a lens system 17, such as a Fresnel lens, into a substantially parallel beam which is directed onto the polariser 12. The plane polarised beam of light which is emergent from the polariser 12 falls on the surface 9 of the matrix and is transmitted through the nitrobenzene in the glass tubes 7. However, since the light beam has been plane polarised by the first polariser 12 in a direction perperpendicular to the plane of polarisation of the second polariser 13, the light emerging from the cells of the matrix is blocked by the second polariser 13.

The X drive source 5 is operable to apply a voltage between the electrodes 4 on the facing surfaces of any selected two adjacent boards 1 so as to produce a first electric field across all the row of elements 11 of nitrobenzene located between the selected two adjacent boards 1. Similarly the Y drive source 6 is operable to apply a voltage between the electrodes 4 of any selected two adjacent boards 2 to produce a second electric field, perpendicular to the first electric field, across all the column of elements 11 located between the selected two adjacent boards 2. Thus, the element 11 which is located both in the selected row and in the selected column is subjected to the first and second mutually perpendicular electric fields and hence to a resultant electric field, when both fields are equal, in a direction at 45° to the row and columns of elements. All the other elements of the matrix are subjected to either the first field, or the second field or to no electric field.

It can be shown that the intensity of the light transmitted through the second polariser 13 is proportional to $\sin^2 2\theta \sin^2 (B/2)$, where $\theta$ is the angle between the plane of polarisation of the light incident on the cell and the direction of the electric field and B is the phase difference produced by the cell for light components parallel and perpendicular to the direction of the field. The term $\sin^2 2\theta$ has the value zero for $\theta = 0°, 90°, 180°$ and $270°$ and the value one for $\theta = 45°, 135°, 225°$ and $315°$.

In the present case the fields are parallel and perpendicular to the plane of polarisation of the polariser 12 so that either the first or the second field alone will produce no transmission of light. However, the intensity of transmitted light is a maximum when the applied field is at 45° to the plane of polarisation of the polariser 12. Thus when both the first and second electric fields are applied to an element 11, the resultant field causes the light passing through that element to become elliptically polarised. Consequently, a fraction of the light emerging from this element is passed by the second polariser 13.

The light which is transmitted by the second polariser 133 focussed by a second optical system 18 which may include a Fresnel lens onto a storage area of an optical storage plate 19. Different areas of the plate 19 can be illuminated selectively by applying both the first and second electric fields to that element 11 which corresponds to the selected area.

The storage areas are transparent or opaque in dependence upon the information represented by that area. A photo cell 20 is located behind the storage plate 19 and thus the significance of the information stored at an area which is illuminated due to the corresponding one of the elements 11 being subjected to two perpendicular electric fields is determined by whether or not the photo cell 20 detects any light transmission through the plate 19. Electrical signals from the cell 20 are passed to a utilisation device such as an amplifier 21.

It will be appreciated that the use of an elongated form for the electro-optical material, nitrobenzene in this example, in which the cross-section is very much less than the length, effects a considerable reduction in the volume of the material as compared with previous forms of construction. It has been pointed out above that the electrostatic energy stored in the material is a function of the volume of the material. Hence, the reduced volume of the form of constrution which has been described enables the electrical driving power for the matrix to be reduced.

It has been assumed for simplicity of description that, in absence of applied fields, the light emerging from the matrix is plane polarised in a direction exactly perpendicular to the plane of polarisation of the second polariser and that, accordingly, the light is totally blocked. This is not true in practice. Firstly, for any light ray which is reflected from a surface which is not parallel to, or perpendicular to, the plane of polarisation of the ray the polarisation becomes slightly elliptical. Secondly, there is a small transmission for light which passes through both polarisers at an angle to the optic axis. Both these effects tend to produce some degree of light transmission when there should be no light transmission, leading to a degradation of the overall signal to noise ratio of the system. Both the effects are a function of the angle of the light rays, and it has been found that they do not cause any difficulty in practice if the light beam is such that the light rays do not diverge by more than about 2° from the axis of the beam.

The use of a circular cross-section for the electro-optic material is convenient because suitable glass tubing is readily available. However, other cross-sectional shapes, such as a square section, may be used. Such shapes may be more satisfactory, for example, if a solid material, such as barium titanate is used as the electro-optic material. The necessary condition of total internal reflection may be achieved with solid materials by immersing them in a liquid of appropriate refractive index, or by coating the surface with a thin layer of reflecting material.

The embodiment which has been described utilised a matrix of cells operating in a particular mode. However, it will be apparent that the invention applies equally to single cells, and to other configurations, and that the mode of operation may be different. An alternative mode of operation is described, for example, in U.S. Pat. No. 3,027,806.

I claim:
1. An electro-optical device including an elongate light guide of electro optical material having a longitudinal axis, a face at each end, the end faces being substantially perpendicular to the longitudinal axis, and a boundary surface bounding the sides of the light guide between the end faces; a material surrounding at least the boundary surface; a light beam source arranged to apply a beam of light substantially parallel to the longitudinal axis to one end face, the beam divergence from parallelism with said longitudinal axis being no greater than 2°, the characteristics of the boundary surface of the light guide and the surrounding material being such that the light beam is totally internally reflected in transmission along the light guide; a first polarizer interposed between the beam source and said one end face; a second polarizer positioned relative to the other end face to receive light transmitted along the light guide, the first and second polarizers having mutually perpendicular planes of polarization; and means for producing an effective electrical field across the light guide in a direction at an angle intermediate the planes of polarization of the polarizers to modify the polarization of the light beam transmitted along the light guide.

2. An electro-optical device as claimed in claim 1 in which the light guide consists of material having a first refractive index and the surrounding material has a second different refractive index, and in which the surface characteristics of the light guide boundary surface and the relative first and second refractive indices respectively in combination produce total internal reflection of a light beam passing along the light guide.

3. An electro-optical device as claimed in claim 2 in which the surrounding material is a solid formed with a cylindrical bore extending therethrough and in which the light guide is a liquid electro-optic material contained within the bore, the effective surface characteristics of the light guide boundary surface being dependent upon the surface characteristics of the bore.

4. An electro-optical device as claimed in claim 1 in which the light guide is formed from a solid electro-optical material and in which the material surrounding the boundary surface is a coating of reflecting material applied to said boundary surface.

5. An electro-optical device as claimed in claim 1 in which the means for producing an effective electric field includes first and second opposed pairs of electrodes, the electrodes of a pair respectively being positioned parallel to the longitudinal axis of and on opposite sides of the light guide; and means for selectively energising the electrode pairs to produce for each pair a separate electric field between the electrodes of that pair, the electrode pairs being so positioned that the separate electric fields thereby produced are respectively parallel to the planes of polarization of the polarizers, said effective electrical field being produced only by the concurrent production of the separate fields by both pairs of electrodes.

6. Electro-optical apparatus including a plurality of elongate light guides of electro-optical material, each light guide having a longitudinal axis, a face at each end, the end faces being substantially perpendicular to the longitudinal axis, and a boundary surface bounding the sides of the light guide between the end faces, the light guides of the plurality being arranged with their longitudinal axes parallel; a material surrounding at least the boundary surface of each light guide; a light beam source arranged to supply a beam of light to one end of the light guides of the plurality substantially parallel to the longitudinal axes thereof, the beam divergence from parallelism with said longitudinal axes being no greater than 2°, the characteristics of the boundary surfaces of the light guides and the surrounding material respectively being such that in each light guide light is transmitted along the light guide by total internal reflection; a first polarizer interposed between the beam source and said one end faces of the light guides; a second polarizer positioned relative to the other end faces of the light guides to receive light transmitted by the light guides, the first and second polarizers having mutually perpendicular planes of polarization; and means for selectively producing a relation to at least one light guide of the plurality an effective electrical field across said one light guide in a direction at an angle intermediate the planes of polarization of the polarizers to modify the polarization of light transmitted along said one light guide.

7. Electro-optical apparatus as claimed in claim 6 in which the light guides of the plurality are arranged in rows and columns, the rows and columns respectively being arranged parallel to the planes of polarization of the first and second polarizers, and in which the means for producing an electrical field includes row and column electrodes, the electrodes of a row being arranged respectively on either side of the light guides of that row and the electrodes of a column being arranged respectively on either side of the light guides of that column; and means for selectively energising the electrodes of a selected row and a selected column to produce at that one light guide in the selected row and column electrical fields respectively parallel to said planes of polarization, the fields coacting to produce said effective field only across said one light guide.

8. Electro-optical apparatus as claimed in claim 7 including separators arranged in matrix formation of rows and columns, the row and column-separators being interlocked to form cells, each cell containing a single light guide and in which the electrodes are carried by the separators.

9. Electro-optical apparatus as claimed in claim 8 including an information storage plate in which items of information are stored in areas arranged in rows and columns to correspond with the rows and columns of the light guides, information items being represented in the areas by variations in the light transmitting properties of the plate within the areas, the information storage plate being arranged in relation to the light guides to receive light transmitted by each of the light guides through the second polarizer at the corresponding information item storage area; and means responsive to light passing through the corresponding information item storage area from the selected light guide.

References Cited

UNITED STATES PATENTS

| | | | |
|---|---|---|---|
| 2,002,515 | 5/1935 | Worrall | 350—150 |
| 2,163,550 | 6/1939 | Clothier et al. | 350—150 |
| 3,027,806 | 4/1962 | Koelsch et al. | 350—150 |
| 3,272,988 | 9/1966 | Bloom et al. | 350—150 |
| 3,353,896 | 11/1967 | Blattner | 350—150 |
| 3,408,133 | 10/1968 | Lee | 350—150 |
| 3,030,852 | 4/1962 | Courtney-Pratt. | |

OTHER REFERENCES

Fleisher et al.: IBM Technical Bulletin, vol. 6, No. 3, August 1963.

DAVID SCHONBERG, Primary Examiner

P. R. MILLER, Assistant Examiner

U.S. Cl. X.R.

350—96, 147